(12) United States Patent
Goik et al.

(10) Patent No.: US 7,244,029 B2
(45) Date of Patent: Jul. 17, 2007

(54) LASER PROJECTOR HAVING TEMPERATURE CONTROL

(75) Inventors: Krystian Goik, Oakville (CA); Timothy I. Fillion, Bedford, MA (US)

(73) Assignee: Virtek Vision International Inc., Waterloo, Ontario (CA)

( * ) Notice: Subject to any disclaimer, the term of this patent is extended or adjusted under 35 U.S.C. 154(b) by 347 days.

(21) Appl. No.: 10/961,599

(22) Filed: Oct. 8, 2004

(65) Prior Publication Data

US 2006/0077354 A1   Apr. 13, 2006

(51) Int. Cl.
*G03B 21/16* (2006.01)
*G03B 21/18* (2006.01)
*G03B 21/26* (2006.01)
*H04N 5/74* (2006.01)
*H01S 3/04* (2006.01)

(52) U.S. Cl. .............................. 353/52; 353/56; 353/57; 353/58; 353/60; 353/61; 348/748; 372/34

(58) Field of Classification Search .................. 353/57, 353/52, 58, 60, 61; 348/748; 349/161; 372/34, 372/36
See application file for complete search history.

(56) References Cited

U.S. PATENT DOCUMENTS

| 5,901,167 A  * | 5/1999 | Sukhman et al. ............. 372/58 |
| 6,547,397 B1 | 4/2003 | Kaufman et al. |
| 2003/0133487 A1* | 7/2003 | Vogler ......................... 372/55 |

* cited by examiner

*Primary Examiner*—W. B. Perkey
*Assistant Examiner*—Rochelle Blackman
(74) *Attorney, Agent, or Firm*—Howard & Howard Attorneys, P.C.

(57) ABSTRACT

A laser projector including a cooling system having an internal wall dividing the housing into a first compartment containing the optical components and a second compartment containing the electrical components, wherein the internal wall has a first face receiving the optical components and a second face receiving the electrical components thermally isolated from the first face. The internal wall includes a cooling channel and a fan directs air through the channel to maintain the optical components below a maximum operating temperature. The internal wall in one disclosed embodiment includes two parallel wall members each having a plurality of parallel channels, a thermoelectric cooling element located on the wall adjacent the first compartment, a sensor is located in the first compartment and a control maintains a temperature below ambient in the first chamber.

29 Claims, 4 Drawing Sheets

Fig-1

LASER PROJECTOR HAVING TEMPERATURE CONTROL

FIELD OF THE INVENTION

This invention relates to a laser projector having a cooling system to prevent damage to the optical components of the laser projector, including the laser and the galvanometers which thermally isolates the optical components from the electrical components, and the laser projector of this invention may also control the temperature of such optical components within a predetermined safe range.

BACKGROUND OF THE INVENTION

Visible laser projection systems are now widely used in industry to project a laser outline or "template" on a target or work surface for assembling large two or three-dimensional structures or assemblies, such as prefabricated roof trusses or aerospace composite components. By precisely characterizing the laser projector and establishing the exact relative position of the laser projector to the assembled structure or composite, the laser projection system is capable of accurately producing a laser template at known coordinates on a work or target surface which may be planar or curvilinear.

Laser projectors typically include optical components and electrical and power components. The optical components include a laser which produces a beam of light or a laser beam, a collimator to shape and focus the beam, and a pair of galvanometers to deflect the laser beam in an X-Y plane. As the speed of deflecting the beam is increased, more heat is generated within the laser projector. However, the laser and galvanometers typically have a maximum recommended operating temperature, above which such components will be subject to damage. Further, the electrical or power components of the laser projector will also generate heat, but such components operate at a much greater temperature. Thus, there has been a long felt need to maintain the temperature of the optical components below the maximum recommended operating temperature to avoid damage to such components.

The prior art has proposed cooling systems for laser projectors, such as a hood or shroud having fans directing cooling air against a plate and cooling fins on the side cover as disclosed, for example, in U.S. Pat. No. 6,547,397. However, the electrical and power components of the laser system disclosed in U.S. Pat. No. 6,547,397 are located in the same chamber as the optical components and the disclosed cooling system does not efficiently maintain the optical components below the recommended maximum operating temperature of such optical components, particularly the laser and galvanometers.

SUMMARY OF THE INVENTION

This invention relates to a laser projector having a cooling system which thermally isolates the optical components of the laser projector from the electrical components which generate heat or in one preferred embodiment, a temperature control, which maintains the temperature of the critical optical components of the laser projector at a temperature below the maximum recommended operating temperature of such optical components.

The laser projector of this invention includes a housing having an internal wall dividing the housing into two separate compartments or enclosures, including a first compartment containing the optical components of the laser projector and a second compartment containing the electrical or power components of the laser projector, a cooling channel or channels through the internal wall thermally isolating the first compartment containing the optical components from the second compartment containing the electrical components, and a fan directing air through the cooling channel or channels. As set forth above, the optical components of the laser projector, particularly the laser and galvanometers, should be maintained at or below the recommended maximum operating temperature to avoid damage to such optical components and in a preferred embodiment, the optical components are mounted to the internal wall and the mounting surface of the internal wall adjacent the optical components is thermally isolated from the opposed surface adjacent the electrical components. In a more preferred embodiment of the laser projector of this invention, the housing includes two internal wall members each having a cooling channel or channels separating the housing into first and second compartments as described above and the wall members are preferably thermally isolated from each other, such that the optical components of the laser projector are maintained at a temperature below the maximum operating temperature for the laser and galvanometers. In an alternative embodiment, the internal wall includes a first wall portion adjacent the optical components and a second wall portion adjacent the electrical components of the laser projector and the first and second wall portions are thermally isolated. In this embodiment, the cooling channels are also separated to prevent heat transfer between the first and second wall portions.

The temperature of the optical components of the laser projector of this invention may also be maintained within a predetermined range of temperatures. In the disclosed embodiment of the laser projector of this invention, a thermal electric cooler is applied to the outer surface of the wall member adjacent the first compartment of the housing containing the optical components of the laser projector and the first compartment includes a thermal sensor preferably adjacent one of the laser and galvanometers connected to a control for the thermal electric cooling device to maintain the temperature in the first compartment below ambient. As described further below, the maximum operating temperature will depend upon the type of laser utilized in the laser projector. For a red laser, for example, the maximum operating temperature of the laser will be greater than the maximum operating temperature of the galvanometers and thus the thermal electric cooling device is preferably located adjacent the galvanometers where a red laser is utilized. The laser projector of this invention may also include a heater to maintain the temperature within a predetermined range. In the disclosed embodiment of the laser projector, the fan is located at one end of the channel or channels through the wall member or wall members to draw a cooling gas, such as air, through the cooling channels and the opposed end of the channel or channels includes a filter. In this embodiment, an electric heater or heaters may be located in the filter and the thermal sensor and the control will then maintain the temperature within the housing within a predetermined preferred range.

In a preferred disclosed embodiment of the laser projector of this invention, the laser projector includes two rectangular wall members mounted within the housing in parallel adjacent relation which each extend from the floor or base of the housing to the top enclosure or cover and the wall members include a plurality of rectangular channels having integral web portions therebetween, providing uniform cooling of the housing compartments or enclosures, particularly where the wall members are formed of a nonconductive material, such as extruded aluminum and wherein the wall members are thermally isolated. Extruded aluminum also has the advantage of strength for mounting the optical and electrical components to the wall members and a low coefficient of thermal expansion. In a preferred embodiment, wherein the laser projector includes two wall members, the first wall member adjacent the first compartment containing the optical components is not rigidly mounted in the housing to avoid distortion or stress resulting from the difference in temperature between the first and second compartments. In this embodiment, the first wall member is mounted in the housing aligned with a tubular fixture permitting expansion and contraction of the first wall member. In a preferred embodiment, the interface between the first wall member and the tubular fixture is at an angle, permitting expansion and contraction of the first wall member and a thermal isolator is provided between the wall members.

As set forth above, an alternative embodiment of the laser projector of this invention includes one wall separating the first compartment and the second compartment, but the side of the wall adjacent the optical components is thermally isolated from the side of the wall adjacent the electrical components. In this embodiment, the internal wall includes a first wall portion, which is thermally isolated from the second wall portion, and the cooling channels are defined by spaced separated fins integral with the opposed wall portions.

As will be understood, the following description of the preferred embodiments of the laser projector of this invention are for illustrative purposes only and many modifications may be made within the purview of the appended claims as described further below.

DESCRIPTION OF THE PREFERRED EMBODIMENTS

Figure 1:
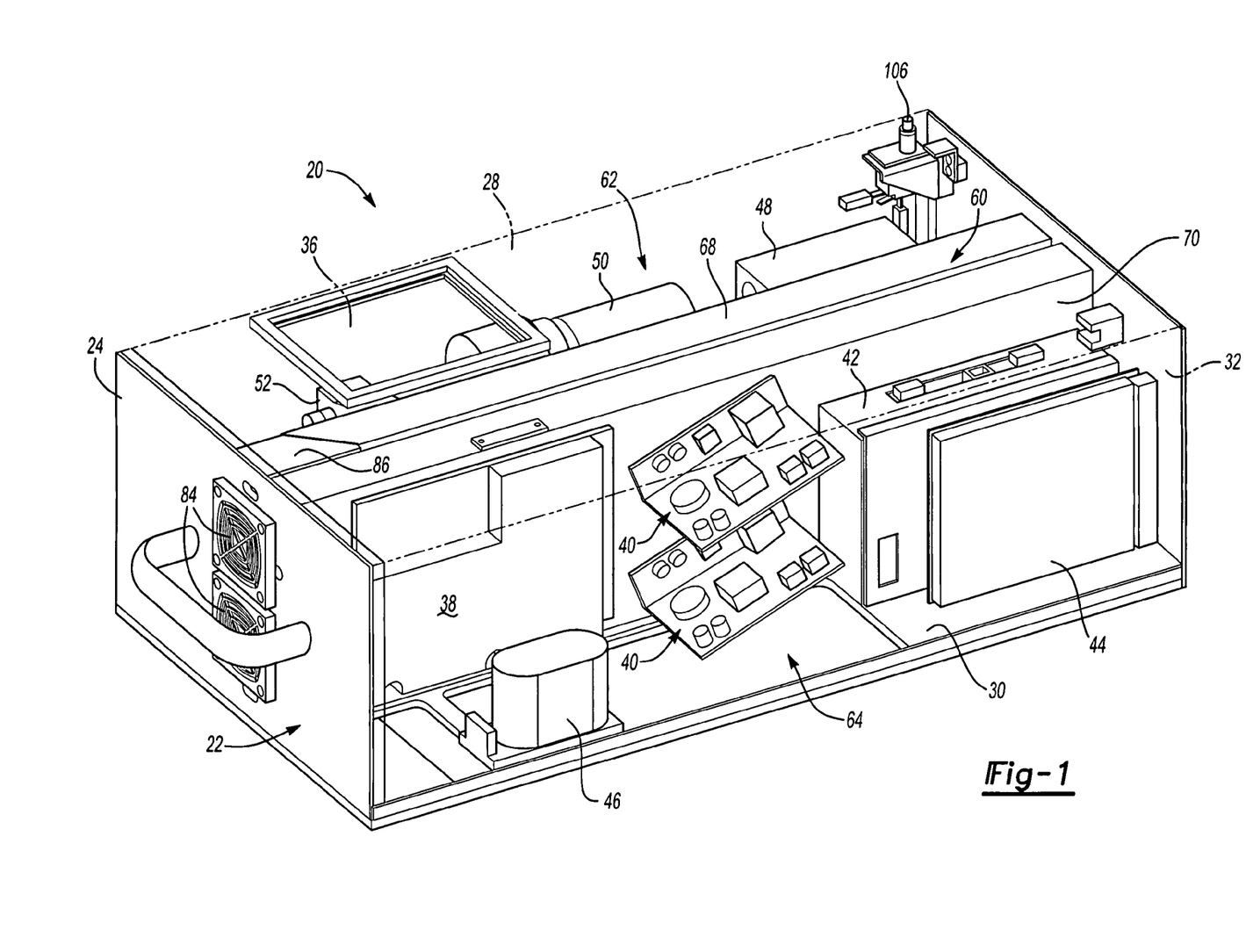
FIG. 1 is a side perspective view of one embodiment of the laser projector of this invention with the cover and side panels shown in phantom.
Figures 2, 6:
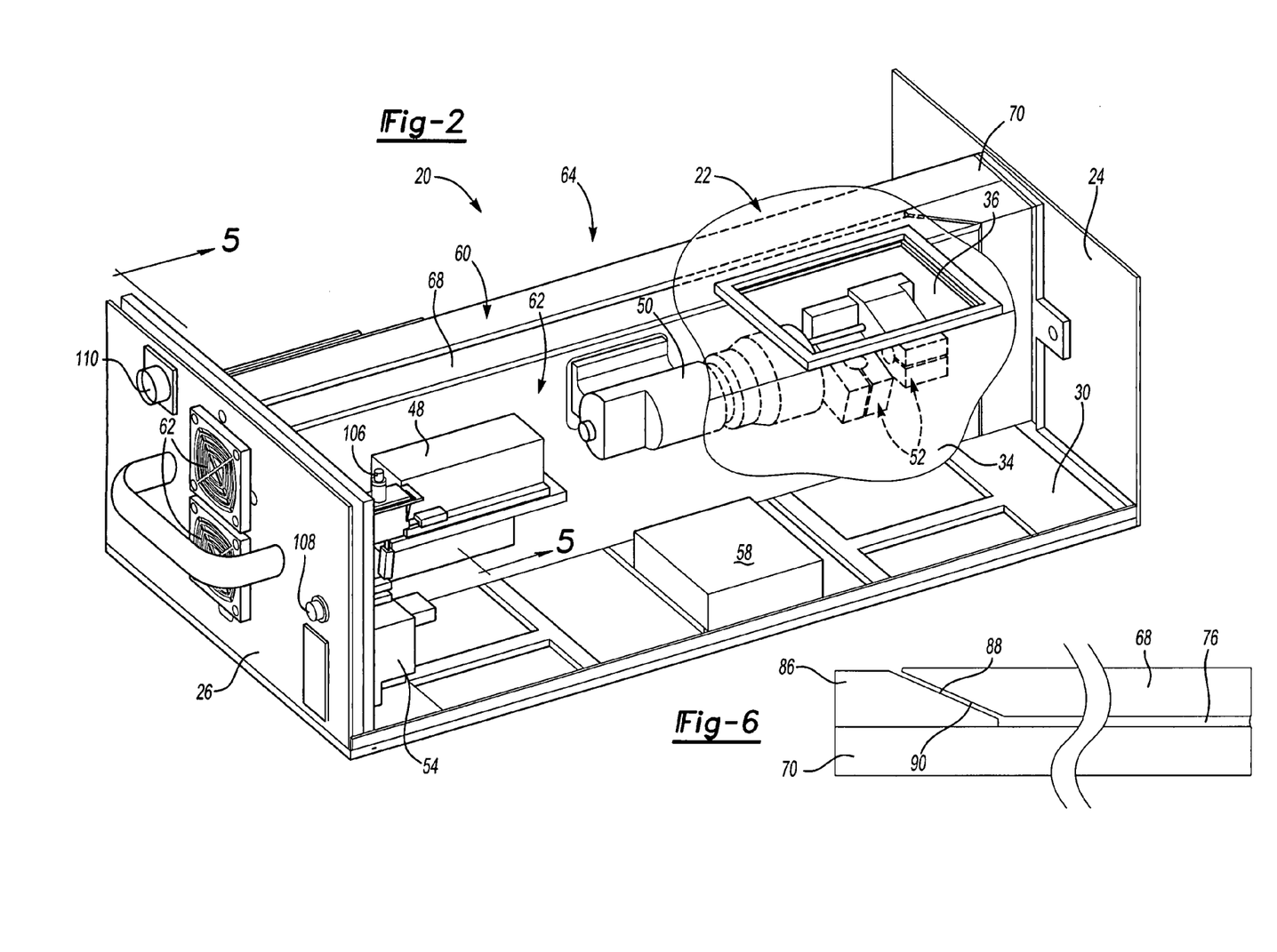
FIG. 2 is a perspective side view of the laser projector shown in FIG. 1 from the opposite side with the cover partially removed.
FIG. 6 is an exploded view of one of the first wall member of the laser of the laser projector shown in FIGS. 1 and 2 illustrating one embodiment of a temperature control.
Figures 3, 5, 7:
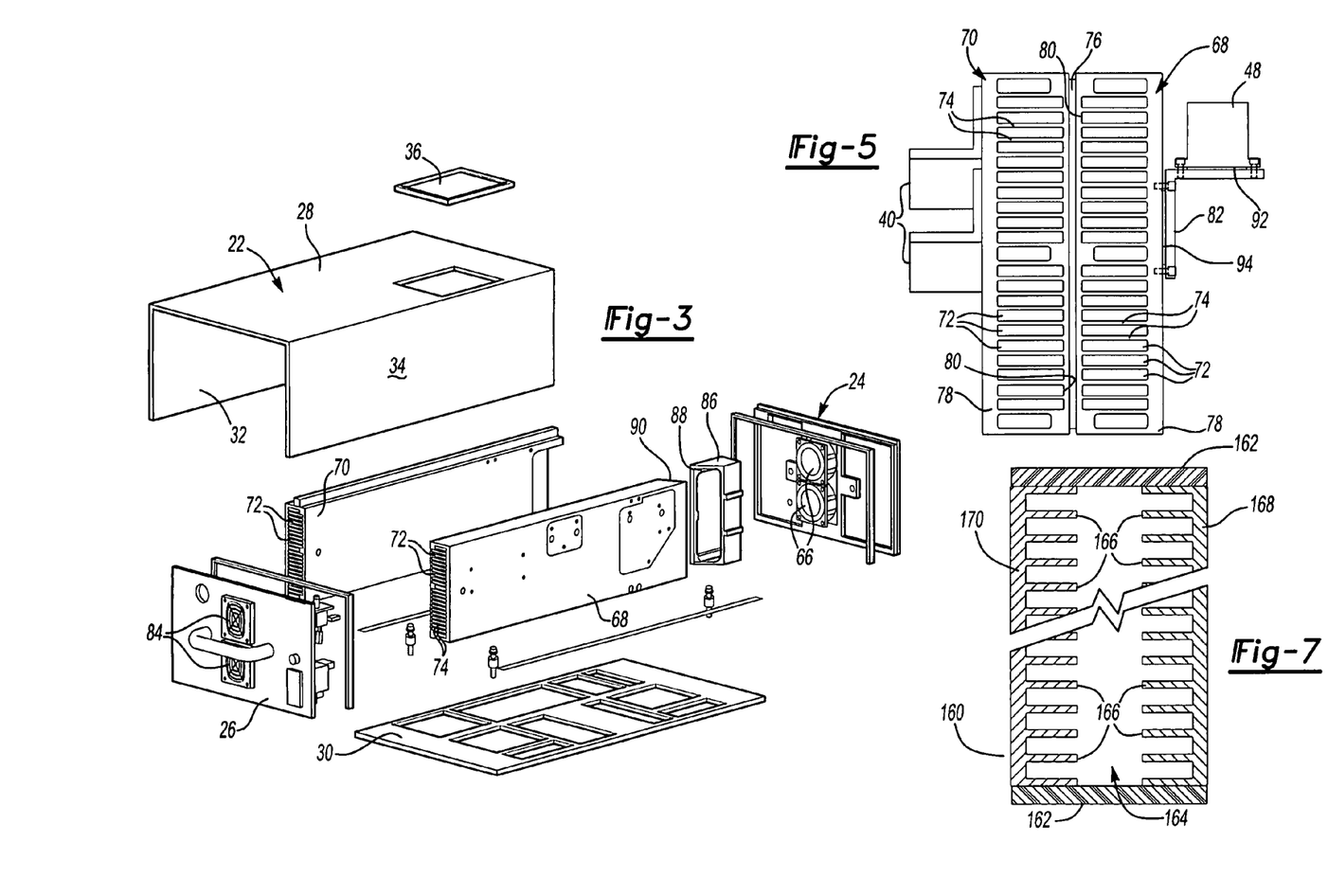
FIG. 3 is an exploded view of the housing components of the laser projector shown in FIGS. 1 and 2.
FIG. 5 is an end view of the wall members illustrating the cooling channels.
FIG. 7 is a cross-sectional end view illustrating an alternative embodiment thermally insulating wall.

FIGS. 1 and 2 illustrate one embodiment of a laser projector 20 of this invention including a housing 22 having end walls 24 and 26, a top wall or cover 28, a bottom wall 30 and side walls 32 and 34 which may be integral with the top wall 28 as shown in FIG. 3. As will be understood, the terms "end," "top," "bottom" and "side" are arbitrary terms used for description purposes only. The top wall or cover 28 includes a clear window 36 through which a laser is projected. The components selected for the laser projector 20 will depend upon the application, but will include optical components and electrical or power components as now described with regard to FIGS. 1 and 2.

FIG. 1 illustrates typical electrical or power components of a laser projector 20, including a power supply 38, electrical servo controllers 40 for the galvanometers, sometimes referred to as "galvo servos," a computer 42 and a control board 44. In one preferred embodiment of the laser projector 20 of this invention, the galvo servos are mounted at an angle as shown in FIG. 1 providing improved air circulation and thereby reducing the temperature. As will be understood, the laser projector 20 will include other electrical or power components, such as the capacitors enclosed in the housing 46 and other electrical components, not shown.

FIG. 2 illustrates the typical optical components of a laser projector 20, including a laser 48, collimator 50 and galvanometers 52. As set forth above, the laser 48 produces a beam of light or laser, the collimator 50 shapes and focuses the laser beam and the galvanometers 52 deflect the beam in an X-Y plane. As will be understood by those skilled in this art, galvanometers include two angularly related mirrors (not shown) which receive the laser beam from the collimator 50 and deflect the laser beam through the window 36. As the speed of deflecting the laser beam is increased, more heat is generated within the laser projector. However, the laser 48 and galvanometers 52 typically have a maximum recommended operating temperature, above which damage will begin to occur as described above. Typically, the maximum operating temperature of a high performance galvanometer is about 50° C. The maximum operating temperature of the laser will depend upon the laser. For example, the maximum operating temperature of a green laser is typically about 40° C., whereas the maximum operating temperature of a red laser is typically about 60° C. Thus, the maximum operating temperature of the optical components of the laser projector 20 illustrated in FIG. 2 will depend upon the optical components. Further, the electrical components of the laser projector 20 shown in FIG. 1 are operated at a greater temperature, and such electrical components generate heat. Thus, efficient thermal cooling to remove the heat generated within the laser projector 20 will improve the performance and extend the life of the optical components. The embodiment of the cooling system shown in FIGS. 1 to 6 of the laser projector 20 of this invention will now be described in detail.

The cooling system for the laser projector 20 includes an internal wall 60 (described below) which divides and thermally isolates the housing 22 into a first chamber or compartment 62 containing the optical components of the laser projector described above, including the laser 48, collimator 50 and galvanometers 52, and a second chamber or compartment 64 which contain the electrical components of the laser projector 20, including the power supply 38, galvo servos 40, control board 44, etc. As described below, the internal wall 60 includes a cooling channel or channels (described below) and a fan or fans 66 circulate a cooling gas, preferably air, through the cooling channel, cooling the components of the laser projector 20, particularly where the optical and electrical components are mounted on the internal wall as described below. In the preferred embodiment of the laser projector 20 of this invention shown in FIGS. 1 to 6, the internal wall 60 is comprised of two wall members, including a first wall member 68 adjacent the first compartment or chamber 62 containing the optical components of the laser projector described above and a second wall member 70 adjacent the second compartment or chamber 64 containing the electrical components of the laser projector described above and the wall members are thermally isolated as described below. As best shown in FIG. 5, each of the wall members 68 and 70 include a plurality of parallel cooling channels 72 separated by integral web portions 74, wherein the web portions 74 are preferably thinner than the width of the channels 72 to improve heat dissipation. In the disclosed embodiment, the wall members 68 and 70 are generally rectangular and located within the housing 20 in parallel side by side relation and are preferably thermally isolated by a thermal barrier 76 shown in FIG. 5. The wall members 68 and 70 are preferably formed of a material having a low coefficient of expansion and contraction and low conductivity and the wall members 68 and 70 may be integrally formed of aluminum, preferably extruded aluminum, such that the channels 72 are parallel. The outer wall 78 of the wall members 68 and 70 may also be thicker than the inner wall 80 to provide additional strength for mounting the electrical and optical components of the laser projector directly to the outer wall 78 of the wall members 68 and 70.

As shown in FIG. 5, for example, the laser 48 is mounted on a bracket 82 by fasteners to the outer wall portion 78 of the wall member 68 and the galvo servos are mounted on the outer wall portion 78 of the wall member 70. In a preferred embodiment of the laser projector 20 of this invention, the major optical components of the laser projector, including the laser 48, collimator 50 and galvanometers 52 are mounted on the outer wall portion 78 of the wall member 68, and the major electrical components, including the power supply 38, galvo servos 40 and computer 42 are mounted on the outer wall 78 of the wall member 70, providing optimum cooling of such components.

As described above, a fan or fans 66 circulate air through the cooling channels 72 of the wall members 68 and 70. In a preferred embodiment, the fans 66 are located at one end of the wall members 68 and 70 and draw air through the channels 72, and filters 84 are located at the opposed ends of the wall members 68 and 70 to filter the air drawn through the channels 72. The wall member 70 may be rigidly mounted in the frame 22 as shown. However, the wall member 68 to which the optical components of the laser projector are attached is preferably mounted within the housing 22 to avoid transferring stresses to the optical components in a "floating mount." In the disclosed embodiment, the first wall member 68 adjacent the first chamber 62 enclosing the optical components of the laser projector includes a channel-shaped air collector or coupling 86 having an angled face 86 facing an opposed angled face 90 of the first wall member 68 as best shown in FIGS. 3 and 6, such that the wall member 68 "floats" in the frame 22 and stresses are not transmitted to the optical components of the laser projector 20.

Figure 4:
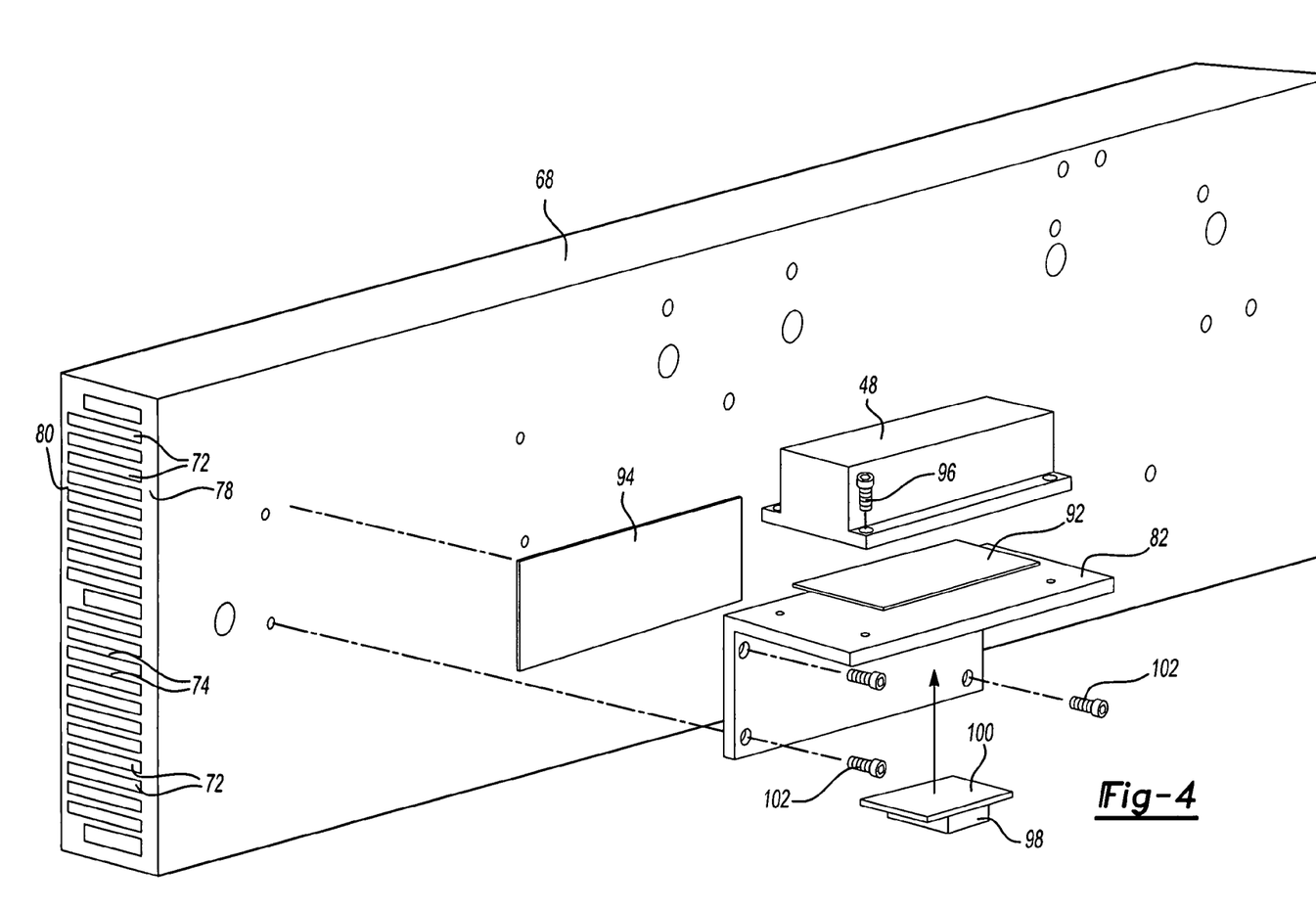
FIG. 4 is a top view of the wall members.

As will be understood from the above description of a preferred embodiment of the laser projector 20 of this invention, dividing the laser projector into two chambers 62 and 64 by an internal wall 60 which thermally isolates the chambers having a cooling channel or channels and circulating a gas through the channel or channels cools the optical components of the laser projector to remove heat generated within the laser projector, improving performance and extending the life of the components, particularly the optical components. However, the optical components may also be cooled below ambient with a cooling element or the temperature may be maintained within a predetermined range of temperatures as now described with reference to FIG. 4. As described above, the wall member 68 includes a plurality of parallel channels 72 separated by integral web portions 74 and air is circulated through the channels 72 by the fan or fans 66. In a preferred embodiment of the laser projector, the components are mounted to the outer wall portion 78 of the wall member 68. As shown in FIG. 4, the laser 48 is mounted on a bracket 82 as described above with regard to FIG. 5. The bracket 82 is L-shaped and a thermally conductive sheet 92 is preferably located between the laser 48 and the horizontally extending portion of the L-shaped bracket 82 and a thermo-electric cooling element 94 is located between the vertical portion of the L-shaped bracket 82 and the outer wall 78 of the wall member 68. The laser 48 is then bolted to the horizontal portion of the L-shaped bracket 82 by screws 96 and the reduced temperature of the first wall member 68 is transferred to the laser 48 by the thermally conductive sheet 92.

In this embodiment, a thermal sensor 98 is located beneath the bracket 82 by an adhesive pad 100 and the vertical portion of the bracket 82 is bolted to the outer wall 78 of the wall member 68 by screws 102, such that the bracket 82 is in intimate contact with the thermo-electric cooling element 94 and the sensor 98 determines the temperature adjacent the laser 48. As will be understood, the sensor 98 may be connected to a control (not shown) which activates the thermo-electric cooling element 94 when the temperature adjacent the laser 48 in the compartment 62 reaches a predetermined maximum and the first chamber 62 is thus maintained at a temperature below ambient. A heating element may also be located in the filters 84 and connected to the control, such that the control may actuate either the thermo-electric cooling element 94 or the heaters to maintain the temperature within a predetermined range of temperatures. The preferred location of the thermal sensor 98 will depend upon the maximum operating temperature of the laser 48. As described above, the preferred maximum operating temperature of a green laser is about 40° C., whereas the preferred maximum operating temperature of a red laser is about 60° C., and the maximum operating temperature of high performance galvanometers 52 is generally about 50° C. Thus, where the laser 48 is a red laser, the thermal sensor is preferably located adjacent the galvanometers 52, rather than the laser 48.

FIG. 7 illustrates an alternative embodiment of an internal wall 160 which divides the laser projector into a first compartment 62 containing the optical components and a second compartment 64 containing the electrical components as described above and thermally isolates the compartments with a single wall. In this embodiment, the wall 160 include a first wall portion 168 adjacent the optical components described above and a second wall portion 170 adjacent the electrical components described above and the wall portions are thermally isolated as now described. In the embodiment shown in FIG. 7, the wall portions 168 and 170 are interconnected by a thermal insulating material such as a carbon fiber or a rigid polymeric material such as propylene. In this embodiment, wall portions are interconnected by top and bottom plates 162 formed of a thermally insulating material forming an internal cooling channel 164 between the wall portions 168 and 170 and the cooling channel 164 includes a plurality of spaced cooling fins 166 integral with the wall portions 168 and 170 projecting into the cooling channel 164. The top and bottom plates 162 may be rigidly secured to the fins 166 or the wall portions 168 and 170 by any suitable means, including an adhesive or fasteners (not shown). In a preferred embodiment, the optical components are fixed to one wall portion, 168 or 170, and the electrical components are fixed to the opposed wall portion, as described above. A fan or fans 66 draw air through the cooling channel 164. Except as described above, the laser projector may be identical to the laser projector 20 described above with regard to FIGS. 1 to 6.

As will be understood, various modifications may be made to the laser projector of this invention within the purview of the appended claims. For example, the internal wall 60 shown in FIGS. 1 to 6 which divides the housing into a first and second compartments 62 and 64, respectively, may be a single wall member 160 having one or a plurality of cooling channels, although two adjacent thermally isolated wall members 68 and 70 are preferred. The wall members 68 and 70 in FIGS. 1 to 6 or the wall portions 168 and 170 shown in FIG. 7 may be integrally formed from aluminum extrusions. A single fan 66 may also be utilized, although it has been found that two cooling fans are preferred, wherein one cooling fan is located in a midportion adjacent an upper end of the wall members or wall portions and a second fan is located at a midportion adjacent the lower end of the wall members or wall portions, providing excellent heat transfer. Further, the channels 72 may be any suitable shape, particularly where the wall members are cast rather than extruded. The housing 22 may also be any convenient shape and the cover 28 may be integral with the side walls 32 and 34 as shown in FIG. 3 or the cover 28 and side walls 32 and 34 may be separate. The disclosed embodiment of the laser projector 20 also includes a safety switch 106 which prevents actuation of the laser projector 20 without the cover 28, and indicator light 108 and a computer connection 110, but these components are conventional and do not form part of this invention. Further, the use of a cooling element or a heating element is optional, but a cooling element may be preferred in industrial applications having a great deal of use. As set forth above, the components of the laser projector will depend upon the application, but the laser projector 20 of this invention will include optical components, including a laser, collimator and galvanometers, and electrical components, including a power supply, galvo servos, computer and controls. Having described a preferred embodiment of the laser projector of this invention, the invention is now claimed as follows.

The invention claimed is:

1. A laser projector having a cooling system, comprising:
a housing;
an internal thermal insulating wall of said housing dividing said housing into two separate compartments, including a first compartment containing optical components of said laser projector including a laser and galvanometer, and a second compartment containing electrical components of said laser projector including a power supply generating heat;
said internal thermal insulating wall including an internal cooling channel extending substantially parallel to said internal wall;
said internal wall having a first side adjacent said optical components and a second side adjacent said electrical components thermally isolated from said first side; and
a fan directing air through said cooling channel cooling said internal wall and creating a thermal barrier between said compartments.

2. The laser projector as defined in claim 1, wherein said internal wall extends from a top wall to a bottom wall of said housing and said cooling channel including a plurality of vertically spaced generally parallel cooling channels separated by web portions.

3. The laser projector as defined in claim 1, wherein said optical components of said laser projector are mounted on said first side of said internal wall.

4. The laser projector as defined in claim 1, wherein said internal wall of said housing includes a first wall portion having said first side and a second wall portion having said second side and said first and second wall portions are interconnected by a thermal insulating material.

5. The laser projector as defined in claim 4, wherein said internal wall adjacent said first compartment includes a thermo-electric cooler reducing a temperature in said first compartment below ambient.

6. The laser projector as defined in claim 5, wherein said first compartment includes a temperature sensor adjacent one of said laser and said galvanometer and a control actuating said thermo-electric cooler when a temperature of said sensor reaches a predetermined maximum temperature.

7. The laser projector as defined in claim 1, wherein said cooling channel comprises a plurality of parallel channels separated by integral web portions.

8. The laser projector as defined in claim 1, wherein said internal wall comprises two adjacent wall members, including a first wall member having a cooling channel therethrough adjacent said first compartment and a second wall member having a cooling channel therethrough adjacent said second compartment, and said fan directing air through said channels through said first and second wall members.

9. The laser projector as defined in claim 8, wherein said first and second wall members are thermally isolated.

10. The laser projector as defined in claim 8, wherein said fan draws air through one end of said channels of said first and second wall members and the opposed ends of said channels includes a filter.

11. The laser projector as defined in claim 8, wherein said optical components are mounted on said first wall member.

12. The laser projector as defined in claim 11, wherein said electrical components are mounted on said second wall member.

13. The laser projector as defined in claim 8, wherein said second wall member is rigidly mounted in said housing and said first wall member is mounted in said housing coaxially aligned with a channel-shaped fixture avoiding stress in said first wall member.

14. The laser projector as defined in claim 1, wherein said internal wall includes a heater and a cooling element connected to a sensor located within said first compartment, and said heater and cooling element connected to a control controlling a temperature within said first compartment within a predetermined range.

15. A laser projector having a cooling system, comprising:
a housing;
a first wall member having an internal channel therethrough extending substantially parallel to said first wall member;
a second wall member having an internal channel therethrough extending substantially parallel to said second wall member, and said second wall member adjacent and substantially parallel to said first wall member;
said first and second wall members located within said housing, providing a thermal barrier between said compartments and dividing said housing into two separate compartments, including a first compartment adjacent said first wall member containing optical components of said laser projector, including a laser and galvanometer, and a second compartment adjacent said second wall member containing electrical components of said laser projector including a power supply generating heat; and
a fan directing a gas through said internal channels of said first and second wall members cooling said first and second wall members and maintaining a temperature in said first compartment below a temperature which would cause damage to said optical components of said laser projector.

16. The laser projector as defined in claim 15, wherein said optical components of said laser projector are mounted on said first wall member.

17. The laser projector as defined in claim 15, wherein said electrical components of said laser projector are mounted on said second wall member.

18. The laser projector as defined in claim 15, wherein said first wall member includes a cooling element connected to a sensor located within said first compartment and a control connected to said sensor and said cooling element actuating said cooling element when a temperature in said first compartment exceeds a predetermined maximum temperature.

19. The laser projector as defined in claim 18, wherein said sensor is located adjacent one of said laser and said galvanometer.

20. The laser projector as defined in claim 15, wherein said fan draws air through one end of said channels through said first and second wall members and an opposed end of said channels includes a filter.

21. The laser projector as defined in claim 15, wherein said first wall member includes a cooling element and one of said first and second wall members includes a heating element, a sensor located in said first compartment and a control connected to said sensor actuating one of said cooling and heating elements to maintain a temperature within said first compartment within a predetermined range.

22. The laser projector as defined in claim 15, wherein said first and second wall members are rectangular and generally parallel in near abutting relation.

23. The laser projector as defined in claim 22, wherein said first and second wall members are thermally isolated from each other.

24. The laser projector as defined in claim 15, wherein said first and second wall members are formed of aluminum each having a plurality of parallel channels separated by integral web portions.

25. A laser projector having a cooling system, comprising:
a housing;
a first wall member having an internal channel therethrough;
a second wall member having an internal channel therethrough;
said first and second wall members each having a height substantially greater than a width mounted within said housing in generally parallel thermally isolated relation and dividing said housing into two compartments, including a first compartment adjacent said first wall member containing optical components of said laser projector including a laser and galvanometer mounted on an exterior of said first wall member and a second compartment containing electrical components of said laser projector, including a power supply mounted on an exterior of said second wall member; and
two fans directing a gas through said channels of said first and second wall members, including a first fan adjacent a top of said channels and a second fan adjacent a bottom of said channels maintaining a temperature in said first compartment below a temperature which may cause damage to said optical components of said laser projector.

26. The laser projector as defined in claim 25, wherein said rectangular first and second wall members are mounted in said housing in side to side relation with a thermal barrier therebetween.

27. The laser projector as defined in claim 25, wherein said first wall member includes a cooling element connected to a control and a sensor within said first compartment and said control maintaining a temperature within said first compartment less than ambient.

28. A laser projector having a cooling system, comprising:
a housing;
an internal wall extending from a top wall to a bottom wall of said housing dividing said housing into two separate compartments, including a first compartment containing optical components of said laser projector including a laser and galvanometer, and a second compartment containing electrical components of said laser projector including a power supply;
a cooling channel through said internal wall including a plurality of vertically spaced generally parallel cooling channels separated by web portions;
said internal wall having a first side adjacent said optical components and a second side adjacent said electrical components thermally isolated from said first side; and
a fan directing air through said cooling channel.

29. A laser projector having a cooling system, comprising:
a housing;
an internal wall of said housing dividing said housing into two separate compartments, including a first compartment containing optical components of said laser projector including a laser and galvanometer, and a second compartment containing electrical components of said laser projector including a power supply;
a cooling channel through said internal wall;
said internal wall having a first side adjacent said optical components and a second side adjacent said electrical components thermally isolated from said first side;
a fan directing air through said cooling channel; and
said internal wall including a heater and a cooling element connected to a sensor located within said first compartment, said heater and cooling element connected to a control controlling a temperature within said first compartment within a predetermined range.

* * * * *

UNITED STATES PATENT AND TRADEMARK OFFICE
CERTIFICATE OF CORRECTION

PATENT NO. : 7,244,029 B2 Page 1 of 1
APPLICATION NO. : 10/961599
DATED : July 17, 2007
INVENTOR(S) : Krystian Goik and Timothy I. Fillion It is certified that error appears in the above-identified patent and that said Letters Patent is hereby corrected as shown below:

Column 10, line 22, please delete "wail" and insert --wall--.

Signed and Sealed this

Ninth Day of October, 2007

JON W. DUDAS
*Director of the United States Patent and Trademark Office*